United States Patent [19]

Kagechi et al.

[11] Patent Number: 5,053,275
[45] Date of Patent: Oct. 1, 1991

[54] SOLAR HEAT SELECTIVE ABSORPTIVE FIBER MATERIAL

[75] Inventors: Shunsaku Kagechi; Masanori Fujimoto, both of Osaka, Japan

[73] Assignee: Descente Ltd., Osaka, Japan

[21] Appl. No.: 121,855

[22] Filed: Nov. 17, 1987

[30] Foreign Application Priority Data

Aug. 7, 1987 [JP] Japan .............................. 62-198488

[51] Int. Cl.$^5$ .............................................. D02G 3/00
[52] U.S. Cl. ................................. 428/372; 428/364; 428/373; 428/374; 428/379
[58] Field of Search ................ 428/364, 372, 373, 374, 428/379, 367

[56] References Cited

U.S. PATENT DOCUMENTS

| | | |
|---|---|---|
| 4,015,582 | 4/1977 | Liu et al. .............................. 126/450 |
| 4,065,592 | 12/1977 | McAllister ....................... 126/449 X |
| 4,306,542 | 12/1981 | Reinert ................................ 126/901 |
| 4,334,523 | 6/1982 | Spanoudis ....................... 126/901 X |
| 4,585,464 | 4/1986 | Haylock et al. ................. 428/372 X |

Primary Examiner—Lorraine T. Kendell
Attorney, Agent, or Firm—Oblon, Spivak, McClelland, Maier & Neustadt

[57] ABSTRACT

Fibers having effective selective absorption of solar energy properties with a minimum loss of heat radiation is useful for clothings, such as sports and leisures, or interior goods, such as curtains, or outdoor leasure goods, such as tents, spun from a mixture of transition metal carbide powder with a thermoplastic synthetic linear polymer, optionally also containing an aluminum powder. Alternatively, a sheath/core compound filament is obtained by compound spinning wherein a synthetic linear polymer forms the sheath and a mixture of a transition metal powder with a thermoplastic synthetic linear polymer, optimally also containing aluminum powder, forms the core.

10 Claims, 1 Drawing Sheet

① ②

① ②

SOLAR HEAT SELECTIVE ABSORPTIVE FIBER MATERIAL

BACKGROUND OF THE INVENTION

This invention relates to fiber materials having properties such as effective selective absorption of solar energy with a minimum loss of heat radiation useful for clothings such as sports, leisure or interior goods, for instance curtains or tents and the like.

A variety of manufacturing processes are applied to clothings for sports or leisure like ski, skating, mountain climbing, fishing and the like or outdoor goods for a tent and the like, interior goods like curtain and the like with a view towards imparting thermal insulation or providing warmth. One of such manufacturing processes involves provision for efficiently absorbing solar heat and to prevent reflection of the light rays.

SUMMARY OF THE INVENTION

An object of this invention is to eliminate the conventional technical problems by applying solar heat selective absorptive properties of high performance to the fiber itself which becomes a raw material of clothings.

The solar heat selective absorptive fiber to be provided by this invention is obtained by melt spinning of kneaded composition of carbide powder of transition metal belonging to periodic table IV group with a thermoplastic linear polymer, or a mixed powder of said carbide with a aluminum and thermoplastic synthetic linear polymer or compound melt spinning of the kneaded composition of said carbide powder, or carbide powder and aluminum, with a thermoplastic synthetic linear polymer.

Heretofore, as the effective means for obtaining the desired results of absorbing solar heat a multilayer film of metal, dielectric material, semiconductor material and the like was placed on the surface of the fiber cloth.

The formation of the film by this conventional technique is carried out by mixing fine powder of the material that becomes solar heat absorbing material with a compound, for example, polyurethane, polyacrylic ester and other proper resin base binder and uniformly dispersing it, and coating or printing the dispersed mixture on the surface of the basic fiber material.

However, since the film formation of a multifilm base complicates the process since the coating or the printing must be repeated and, moreover, in view of relationship of bonding density degree of the formed film and the surface of the basic fiber material, there is frequently a problem of interface peel-apart from the portion accompanied by expansion and contraction.

A peak of the solar radiation spectrum exists in the periphery of a wavelength of 0.5 $\mu$m, and it contains more than 95% of the whole energy between the wavelength of 0.3 to 2.0 $\mu$m. For this reason, as the material capable of selectively absorbing the solar heat, the material is required to have high absorption of 0.3 to 2.0 $\mu$m and also have small thermal emissivity in the infrared ray region of more than 2.0 $\mu$m.

The carbide of the transition metal belonging to the periodic table IV group which is used in this invention, TiC, ZrC, HfC and the like, satisfy the requirement of the material mentioned above, but among these materials, ZrC has the most efficient and selective absorptivity so that preferably ZrC is used.

The carbide, such a TiC, ZrC, HfC, is employed as sole powder or as a mixed powder by adding aluminum to the carbide. The powder is preferably as fine as possible, and the use of fine powder whose particle diameter is less than 15 $\mu$m is desirable. Also, a blending ratio of the carbide and aluminum is in the range of 1:0.3~1.0.

As the thermoplastic synthetic linear polymers, the polymers are selected from acryl or polyamide, such as nylon 6, nylon 66, nylon 610, nylon 11, nylon 12, and the like, polyester such as polyethylene terephthalate, polybutylene terephthalate, and polyolefin such as polyethylene, polypropylene, and the like. Particularly, polyamide such as nylon 6, nylon 66 or polyester, such as polyethylene terephthalate may effectively be used.

The TiC, ZrC, HfC powder, or the kneaded composition of the mixed powder of the carbide and aluminum, and the thermoplastic synthetic linear polymer can be prepared by normal methods of adding and mixing the powder to the polymer in melted condition. The carbide powder, or the mixed powder of the carbide and aluminum, is desirably added to the polymer component in an amount of 1 to 10% by weight. When less than 1.0% by weight is added, the solar heat absorbing performance is insufficient and when more than also in case 10% by weight is added, the fluidity of the polymer deteriorates, and the spinning property becomes poor, while at the same time the strength deteriorates.

The kneaded composition itself is melted and spun by the conventional method or the kneaded composition and the thermoplastic synthetic linear polymer, such as the polyamide, polyester and the like are melted and are subjected to compound spinning. For the melt spinning method, an ordinary screw type or pressure melt type extrusion spinning device can be used, but in case of the compound spinning, the construction is formed in such a way that the kneaded composition containing the solar heat absorptive component is formed as the core, and the thermoplastic synthetic linear polymer is formed as the sheath.

The filament spun by the foregoing manner is used for manufacturing of goods, or for particular purposes by knit weaving of the filament alone or of a mixture with other fibers. In case of a mixture with other fibers, any means may be employed, such as mixing fiber, joined yarn, joined twisting, union cloth or union knit.

The carbide, component such as TiC, ZrC, HfC, or the mixed component of the carbide and Al, has properties of absorbing the light energy of more than about 0.6 V, and reflecting the light of lower energy than said light of higher energy. The properties they effectively function to selective absorb solar energy having a wavelength 0.3 to 2.0 $\mu$m. Accordingly, the fiber containing the foregoing excellent solar heat absorptive component in a textile cloth obtained by weaving or knitting functions to effectively absorb solar energy as a whole and to prevent radiation loss.

DETAILED DESCRIPTION OF THE PREFERRED EMBODIMENTS

EXAMPLE 1

2 weight % of ZrC powder whose particle diameter was less than 10 $\mu$m was blended with melted nylon 6, and sufficiently kneaded to uniformly disperse the powder therein. This kneaded composition was spun as a filament of 70D by a screw type melt spinning machine.

There was no problem, such as yarn cut and the like during spinning, and the yarn producing properties were excellent.

The foregoing solar heat selective absorptive fiber was used as a yarn to produce the plain fabric taffeta. The keeping warm or thermal insulation properties were measured of the cloth sample prepared by the foregoing method and of a nylon cloth (blank material) without the solar heat absorptive performance. The results are shown in Table I. Consumed calories and thermal conductivity were obtained by using a thermolabo testing machine, and the moisture permeating property was obtained by using cup method of JIS L-1099.

TABLE I

| sample/properties | consumed calory $(W/m^3 °C.)$ | thermal conductivity $(W/m·°C.)$ | moisture permeability $(g/m^3·h)$ |
| --- | --- | --- | --- |
| cloth sample | 379 | 0.0550 | 331 |
| blank material | 375 | 0.0518 | 429 |

Figure 1:
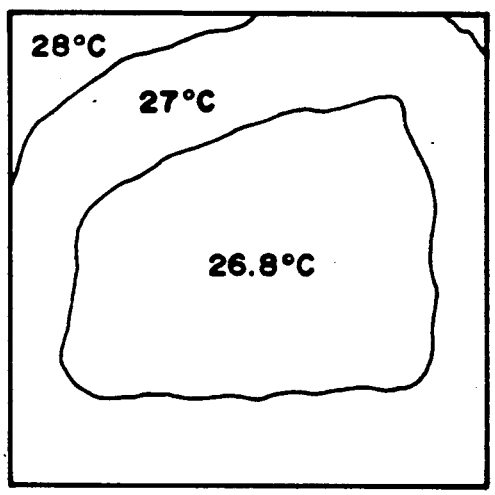
FIG. 1 and FIG. 2 show thermo patterns of cloth samples of Embodiments (1) and (2).
Figure 1:
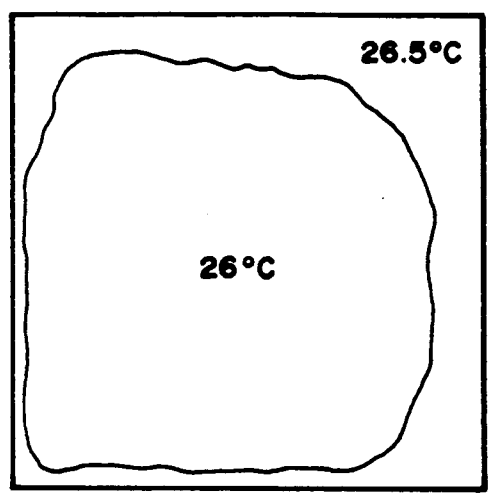

Also, with respect to the cloth sample and the blank material, light was irradiated thereon by an illuminating lamp for photography of 500 W at a distance of 1.5 m, and the heat distribution condition of the surface of the cloth was photographed by a thermo-viewer camera for about 3 minutes. FIG. 1 shows the thermo pattern, and ① in FIG. 1 shows the cloth sample, and ② in FIG. 1 shows the blank material.

From the result of the keeping warm properties and the thermo pattern, it is apparent that the cloth sample woven with the solar heat selective absorptive fiber of this invention has high thermal conductivity and excellent heat absorption performance when compared to the blank material.

EXAMPLE 2

A mixed powder was prepared by blending 3 parts of aluminum powder, whose particle diameter was less than 1 μm, with 5 parts of the ZrC powder, whose particle diameter was less than 3 μm, and 5% by weight of this mixed powder was mixed with nylon 6. The mixture of the mixed powders and nylon 6 were melted and kneaded by a biaxial extruding machine, and then extruded into water to prepare pellets. A compound filament was manufactured by using the pellet like kneaded composition and the nylon 66 by employing a normal compound spinning method so that the kneaded composition formed the core and the nylon 66 formed the sheath.

The resulting solar heat selective absorptive compound filament was used as a yarn to weave a plain fabric taffeta similar to Embodiment (1).

Figure 2:
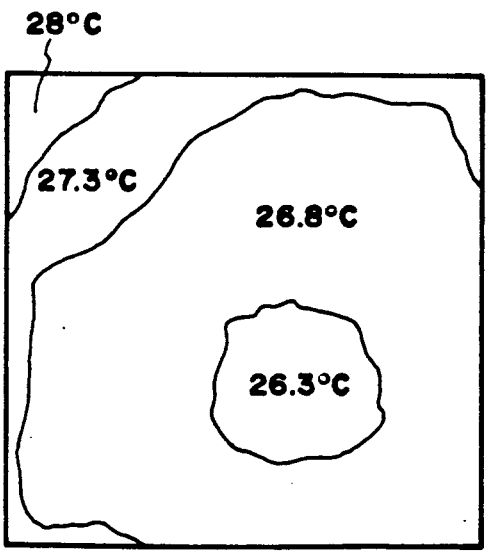
Figure 2:
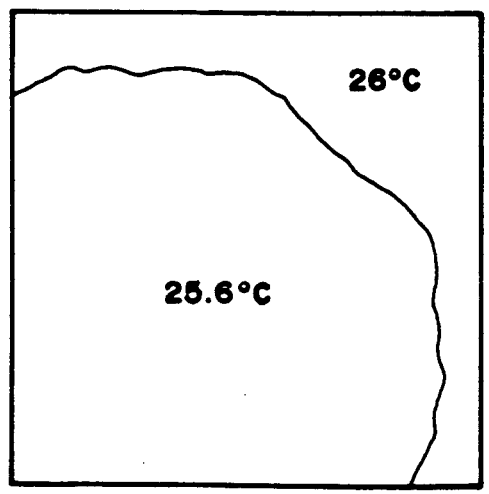

With respect to the blank woven material employing a cloth sample of nylon 6 only, the pattern of the heat distribution was measured by the thermo viewer camera similar to the Embodiment (1), and is shown in FIG. 2. ① in FIG. 2 shows a cloth sample obtained with the fiber of this invention and ② shows each thermo pattern of the blank material.

According to this invention, a fiber is provided which selectively and efficiently absorbs solar heat and in which a material of small heat radiation is uniformly dispersed in the textile weave so that the clothing made of the foregoing cloth according does not generate interface peel-apart, as takes place in the conventional technique by the formation of the film, and maintains a constant and stable solar heat selective absorptive performance. Accordingly, clothing made thereof exhibit excellent performances when used in the making of clothings for sports and leisure requiring keeping warm properties, interior goods, such as curtain and the like, or outdoor leisure goods, such as a tent and the like.

What is claimed is:

1. A solar heat selective absorptive fiber spun from a mixture of:
   a) A carbide powder a transition metal of group IV of the Periodic Table with a thermoplastic synthetic linear polymer, or
   b) a mixed powder of a carbide powder of a transition metal of group IV of the Periodic Table and a powder of aluminum, with a thermoplastic synthetic linear polymer.

2. A solar heat selective absorptive fiber as set forth in claim 1 in which the carbide of said transition metal group IV of the Periodic Table is ZrC.

3. A solar heat selective absorptive fiber as set forth in claim 1 in which the thermoplastic synthetic linear polymer is polyamide or polyester.

4. A solar heat selective absorptive fiber as set forth in claim 1, in which said mixture a) contains from 1 to 10% by weight of said carbide powder of a transition metal of group IV of the Periodic Table.

5. A solar heat selective absorptive fiber as set forth in claim 1, in which said mixture b) contains from 1 to 10% by weight of said mixed powder of a carbide powder of a transition metal of group IV of the Periodic Table and said powder of aluminum.

6. A solar heat selective absorptive sheath/core fiber compound spun from a mixture of:
   a) a carbide powder of a transition metal of group IV of the Periodic Table and a thermoplastic synthetic linear polymer, or
   b) a mixed powder of a carbide powder of a transition metal of group IV of the Periodic Table and a powder of aluminum, and a thermoplastic synthetic linear polymer,
   said mixtures a) or b) forming the core of said sheath/core fiber, and a thermoplastic synthetic linear polymer forming the sheath of said sheath/core fiber.

7. A solar heat selective absorptive sheath/core fiber as et forth in claim 6, in which the carbide powder of said transition metal of group IV of the Periodic Table is ZrC.

8. A solar heat selective absorptive sheath/core as set forth in claim 6 in which the thermoplastic synthetic linear polymer is polyamide or polyester.

9. A solar heat selective absorptive sheath/core as set forth in claim 6, in which said mixture a) contains from 1 to 10% by weight of said carbide powder of a transition metal of group IV of the Periodic Table.

10. A solar heat selective absorptive sheath/core as set forth in claim 6, in which said mixture b) contains from 1 to 10% by weight of said mixed powder of a carbide powder of a transition metal of group IV of the Periodic Table and said powder of aluminum.

* * * * *